(12) United States Patent
Seki et al.

(10) Patent No.: US 8,072,564 B2
(45) Date of Patent: Dec. 6, 2011

(54) LIQUID CRYSTAL DEVICE HAVING A BAND-SHAPED RETARDATION FILM EXTENDING OUTWARDLY TO A PARTING AREA OUTSIDE OF A DUMMY PIXEL AREA

(75) Inventors: Takumi Seki, Suwa (JP); Kosuke Uchida, Suwa (JP)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 12/138,952

(22) Filed: Jun. 13, 2008

(65) Prior Publication Data

US 2008/0309861 A1 Dec. 18, 2008

(30) Foreign Application Priority Data

Jun. 14, 2007 (JP) .................. 2007-157121

(51) Int. Cl.
*G02F 1/1335* (2006.01)
(52) U.S. Cl. ...................... 349/114; 349/117
(58) Field of Classification Search .............. 349/114, 349/117–119
See application file for complete search history.

(56) References Cited

U.S. PATENT DOCUMENTS

| | | | | |
|---|---|---|---|---|
| 2005/0024312 A1* | 2/2005 | Isami et al. ................. 345/89 |
| 2005/0078240 A1* | 4/2005 | Murade ...................... 349/110 |
| 2006/0028599 A1* | 2/2006 | Fukuchi ...................... 349/114 |
| 2006/0114380 A1* | 6/2006 | Kurashima .................. 349/114 |
| 2006/0192912 A1* | 8/2006 | Itou et al. .................... 349/114 |
| 2007/0013773 A1* | 1/2007 | Tsuchiya et al. ............. 348/87 |

FOREIGN PATENT DOCUMENTS

| | | |
|---|---|---|
| JP | 2004-004494 | 1/2004 |
| JP | 2005-338256 | 12/2005 |
| JP | 2006-098623 | 4/2006 |
| JP | 2006-292787 | 10/2006 |
| JP | 2006-292847 | 10/2006 |
| JP | 2007-047732 | 2/2007 |
| JP | 2008-241959 | 10/2008 |
| WO | 2007/063629 A1 | 6/2007 |

OTHER PUBLICATIONS

Japanese Office Action issued Sep. 6, 2011, for corresponding Japanese Appln. No. 2007-157121.

* cited by examiner

*Primary Examiner* — Mark Robinson
*Assistant Examiner* — Paul Lee
(74) *Attorney, Agent, or Firm* — K&L Gates LLP (57) ABSTRACT

A liquid crystal device includes a pair of substrates, a liquid crystal layer sandwiched between the pair of substrates, a display area having a plurality of pixels arranged therein, and a retardation film. Each pixel includes a transmissive display area and a reflective display area. The retardation film is provided on one of the pair of substrates in a band-shape so as to continue across the reflective display areas of the plurality of pixels. An end portion of the band-shaped retardation film is positioned outside the display area.

8 Claims, 9 Drawing Sheets

MOSAIC

FIG. 9B

PHASE DIFFERENCE LAYER

DELTA

LIQUID CRYSTAL DEVICE HAVING A BAND-SHAPED RETARDATION FILM EXTENDING OUTWARDLY TO A PARTING AREA OUTSIDE OF A DUMMY PIXEL AREA

RELATED APPLICATIONS

The present application is based on, and claims priority from, Japanese Application Number 2007-157121, filed Jun. 14, 2007, the disclosure of which is hereby incorporated by reference herein in its entirety.

BACKGROUND

1. Technical Field

The present invention relates to a transflective liquid crystal device and an electronic apparatus having the same.

2. Related Art

One of known transflective liquid crystal devices is a liquid crystal device in which a liquid crystal layer is disposed between an upper substrate and a lower substrate opposed to each other, one dot area includes a transmissive display area and a reflective display area, and the retardation of the liquid crystal layer in the transmissive display area is set to be a larger value than the retardation in the reflective display area at one of the time when a selected voltage is applied and the time when a non-selected voltage is applied (JP-A-2004-4494). Accordingly, the brightness of display in the transmitting mode is improved and hence visibility is improved.

There is also a known liquid crystal display device of a transflective IPS (In Plane Switching) system, in which a reflective display section and a transmissive display section are provided in one pixel, a phase plate is provided at a portion corresponding to the reflective display section, the retardation of the liquid crystal layer in the reflective display area is ¼ wavelength and the retardation of the phase plate is ½ (JP-A-2005-338256). Accordingly, a wide angle of view which is equal to the transmissive IPS system is achieved.

In the liquid crystal display device in the related art, when forming a retardation film (phase plate) in a cell configured by the pair of upper and lower substrates, the thickness (of the layer) is ideally uniform entirely over the formed area. Actually, however, when the layer is formed by patterning so as to correspond to the reflective display area (reflective display section), the end of the formed area is susceptible to variations in thickness. The value of the retardation as designed cannot be obtained at a portion where the thickness of the retardation film varies, and light which cannot be absorbed by a polarizing plate mounted to the surface of the cell is generated. In other words, there is a problem that light leakage occurs at portions in question and hence the contrast is lowered.

SUMMARY

In view of problems described above, the invention is able to be implemented in the following modes or the applications.

EXAMPLE 1

A liquid crystal device according to Example 1 includes a pair of substrates, a liquid crystal layer sandwiched between the pair of substrates, a display area having a plurality of pixels arranged therein, the pixels each including a transmissive display area and a reflective display area, and a retardation film provided on one of the pair of substrates in a band-shape so as to continue across the reflective display areas of the plurality of pixels, and is characterized in that an end portion of the band-shaped retardation film is positioned outside the display area.

In this configuration, since the band-shaped retardation film is provided so as to continue across the reflective display areas of the plurality of pixels on one of the pair of substrates, the end portions, where variation in layer thickness can easily occur, of the band-shaped retardation film are positioned outside the display area. Therefore, possibility of occurrence of light leakage in the periphery of the display area caused by the variations in thickness of the retardation film is reduced. Accordingly, there is provided a liquid crystal device in which the lowering of contrast due to the light leakage in the outer peripheral portion of the display area is reduced.

EXAMPLE 2

Preferably, a parting area is provided outside the display area and the end portion of the band-shaped retardation film is positioned in the parting area.

In this configuration, the light leakage in the end portions, which occurs due to the change in the thickness of the retardation films, can be kept hard to be observed, since the ends of the band-shaped retardation films are positioned in the parting area which does not contribute to display.

EXAMPLE 3

Preferably, the parting area is provided with a light-shielding film formed of light-shielding material.

In this configuration, even when the change in the thickness of the retardation film occurs at the end portions, light leakage is prevented since light is shielded by the light-shielding film.

EXAMPLE 4

Preferably, at least one dummy pixel is provided outside the display area and the end portion of the band-shaped retardation film is positioned within the dummy pixel area where the dummy pixel is arranged.

In this configuration, since the end portion of the band-shaped retardation film is positioned in the dummy pixel area which does not contribute to display, even though a light-leakage caused by the change in the thickness of the retardation film occurs at the end portion, the light-leakage does not substantially affect quality of the display.

EXAMPLE 5

An electronic apparatus according to Example 5 is characterized in that the liquid crystal device described above is mounted.

In this configuration, since the liquid crystal device in which the lowering of contrast in the outer peripheral portion of the display area is reduced is mounted, the electronic apparatus having a superior display quality is provided.

BRIEF DESCRIPTION OF THE DRAWINGS

The invention will be described with reference to the accompanying drawings, wherein like numbers reference like elements. In the drawings used for description, the reduction scales of the individual members are changed as needed for allowing the individual members to be recognized.

DESCRIPTION OF EXEMPLARY EMBODIMENTS

First Embodiment

Liquid Crystal Device

Figure 1A:
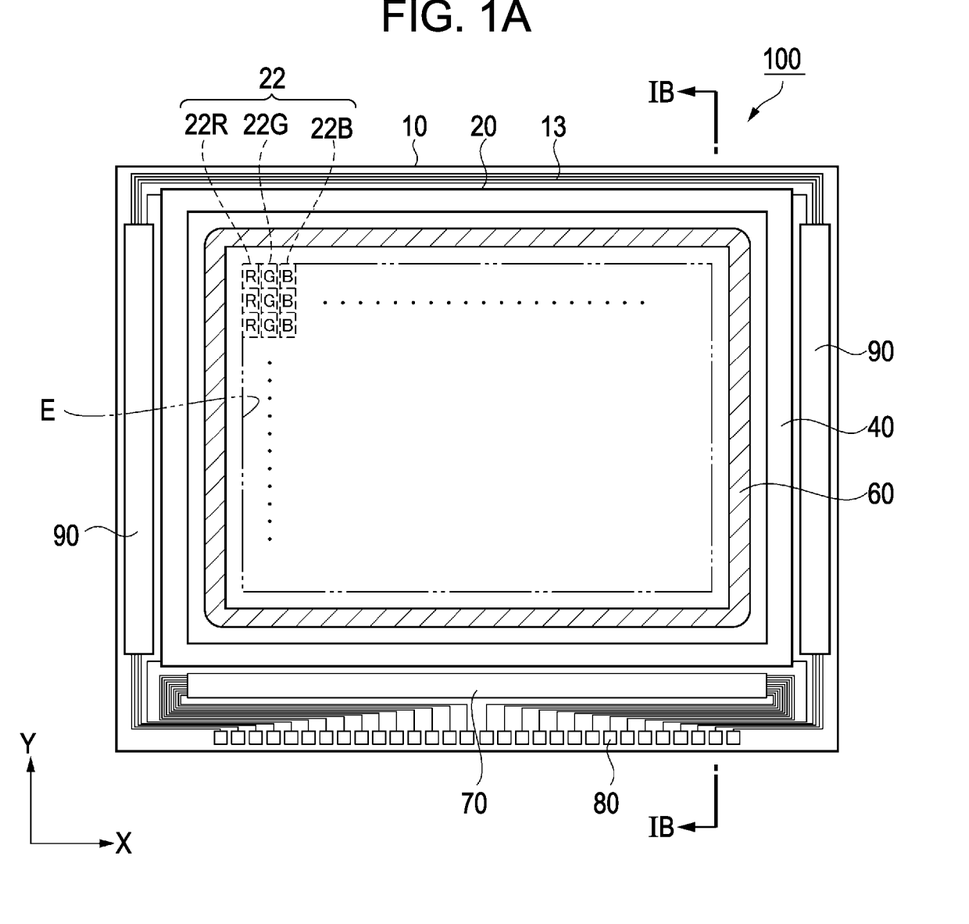
FIG. 1A is a schematic plan view illustrating a configuration of a liquid crystal device.

Referring now to FIG. 1A to FIG. 5B, a liquid crystal device according to the first embodiment will be described. FIG. 1A is a schematic plan view of the liquid crystal device and FIG. 1B is a schematic cross-sectional view taken along a line IB-IB in FIG. 1A.

Figure 1B:
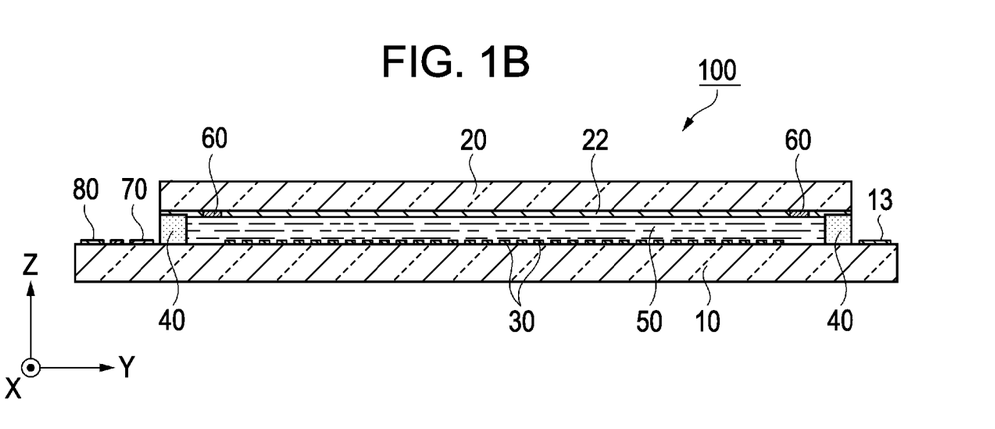
FIG. 1B is a schematic cross-sectional view of a liquid crystal device taken along the line IB-IB in FIG. 1A.

As shown in FIG. 1A and FIG. 1B, a liquid crystal device 100 in the first embodiment includes an element substrate 10 and an opposed substrate 20 as a pair of substrates. The opposed substrate 20 is joined to the element substrate 10, which is larger than the opposed substrate 20, via a sealing member 40 at a predetermined position.

Liquid crystal, having a positive dielectric anisotropy, is filled in a clearance (gap) between the element substrate 10 and the opposed substrate 20, so that a liquid crystal layer 50 is configured. In other words, the liquid crystal layer 50 is sandwiched between the element substrate 10 and the opposed substrate 20.

The outside the sealing member 40 is a peripheral circuit area, and a plurality of mounted terminals 80 for connecting a data line drive circuit 70 and an external circuit are provided along one side of the element substrate 10. The element substrate 10 is provided with scanning line drive circuits 90 along two sides thereof which are opposed in the direction of an X-axis. The element substrate 10 is also provided with a plurality of wires 13 along one remaining side thereof so as to connect the two scanning line drive circuits 90.

The sealing member 40 includes a plurality of pixels arranged inside thereof in the X-axis direction and the Y-axis direction in a matrix pattern. One pixel includes three subpixels corresponding to three color filters 22R (red), 22G (green) and 22B (blue). The three color filters 22R, 22G and 22B are formed on the side of the opposed substrate 20 in such a manner that the color filters in the same color continue in the Y-axis direction. The element substrate 10 is provided with a plurality of TFTs (Thin Film Transistor) 30 as switching elements for driving and controlling the sub-pixels in one to one correspondence therewith. In other words, the liquid crystal device 100 is an active type display device provided with stripe-type color filters to enable color display.

In this embodiment, an area with the plurality of pixels which actually contributes to display is defined as a display area E, and a parting area 60 is provided between the sealing member 40 and the display area E. Although detailed description will be given later, the parting area 60 is provided with a light-shielding film formed of a light-shielding material, which serves as a rough mark to define the position of the display area E when mounting the liquid crystal device 100 to the electronic apparatus.

Polarizing plates are bonded on the front and back faces of the liquid crystal device 100, respectively. The liquid crystal device 100 is illuminated by a lighting unit having LEDs as light sources. In FIG. 1A and FIG. 1B, the polarizing plate and the lighting unit are not shown. The structure of the liquid crystal device 100 will be described in more detail later.

Figure 2:
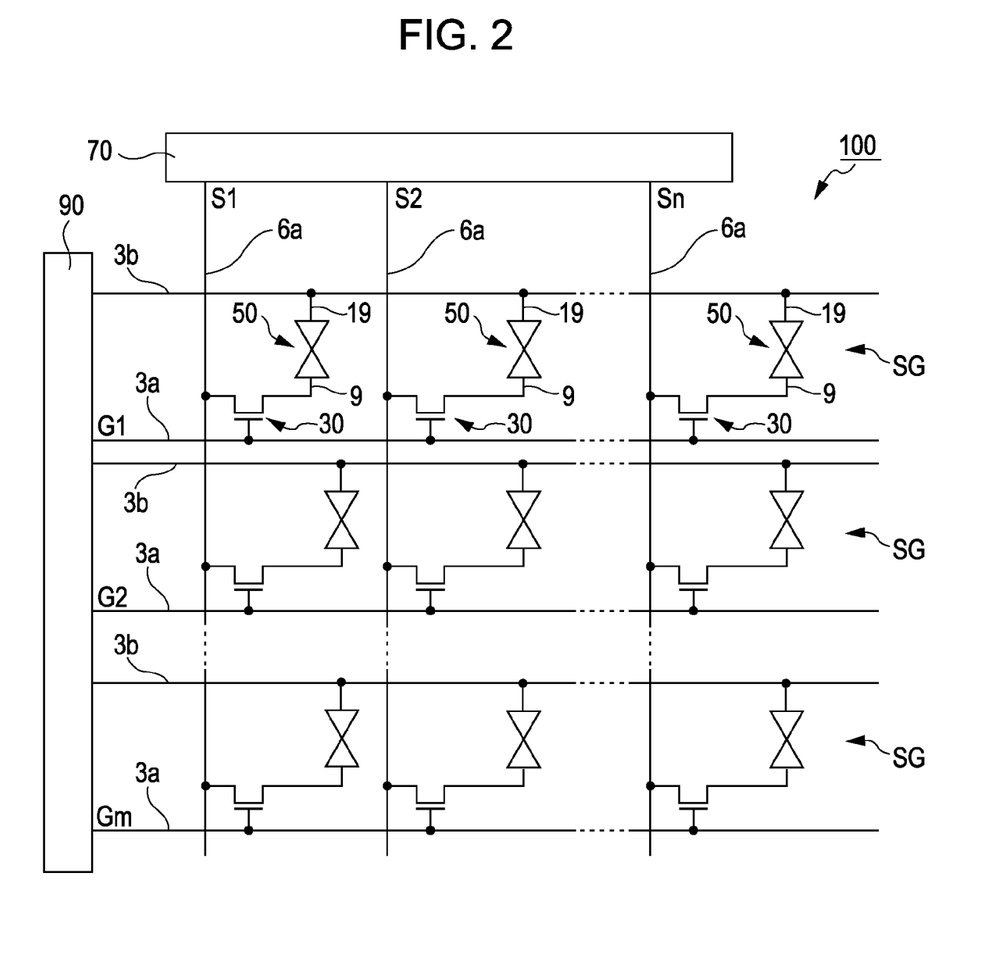
FIG. 2 is an equivalent circuit diagram of the liquid crystal device.

FIG. 2 is an equivalent circuit diagram of the liquid crystal device. As shown in FIG. 2, the subpixels SG which constitute the display area E of the liquid crystal device 100 each include a pixel electrode 9 and the TFT 30 for switch-controlling the pixel electrode 9. The liquid crystal layer 50 is interposed between the pixel electrodes 9 and common electrodes 19. The common electrodes 19 are electrically connected to common lines 3b which extend from the scanning line drive circuits 90, so that the each subpixel SG is maintained at a common potential.

Data lines 6a extending from the data line drive circuit 70 are connected to sources of the TFTs 30. The data line drive circuit 70 supplies image signals S1, S2, . . . Sn to each of the subpixels SG via their own data lines 6a. The image signal S1 to Sn may be supplied in this order in line sequential system, or may be supplied on group-to-group basis to the plurality of data lines 6a adjacent to each other.

Scanning lines 3a extending from the scanning line drive circuits 90 are electrically connected to the gates of the TFTs 30. Scanning signals G1, G2, . . . , Gm to be supplied to the scanning lines 3a in pulses at a predetermined timing from the scanning line drive circuits 90 are applied to the gates of the TFTs 30 in this order in line sequential system. The pixel electrodes 9 are electrically connected to drains of the TFTs 30.

The TFTs 30 as the switching elements are turned ON for a certain period by the entered scanning signals G1, G2, . . . , Gm, so that the image signals S1, S2, . . . Sn supplied from the data lines 6a are written into the pixel electrodes 9 at a certain timing. The image signals S1, S2, . . . Sn at a predetermined level which are written into liquid crystal via the pixel electrodes 9 are retained for a certain period between the pixel electrodes 9 and the common electrodes 19 opposing to each other via the liquid crystal.

Figure 3:
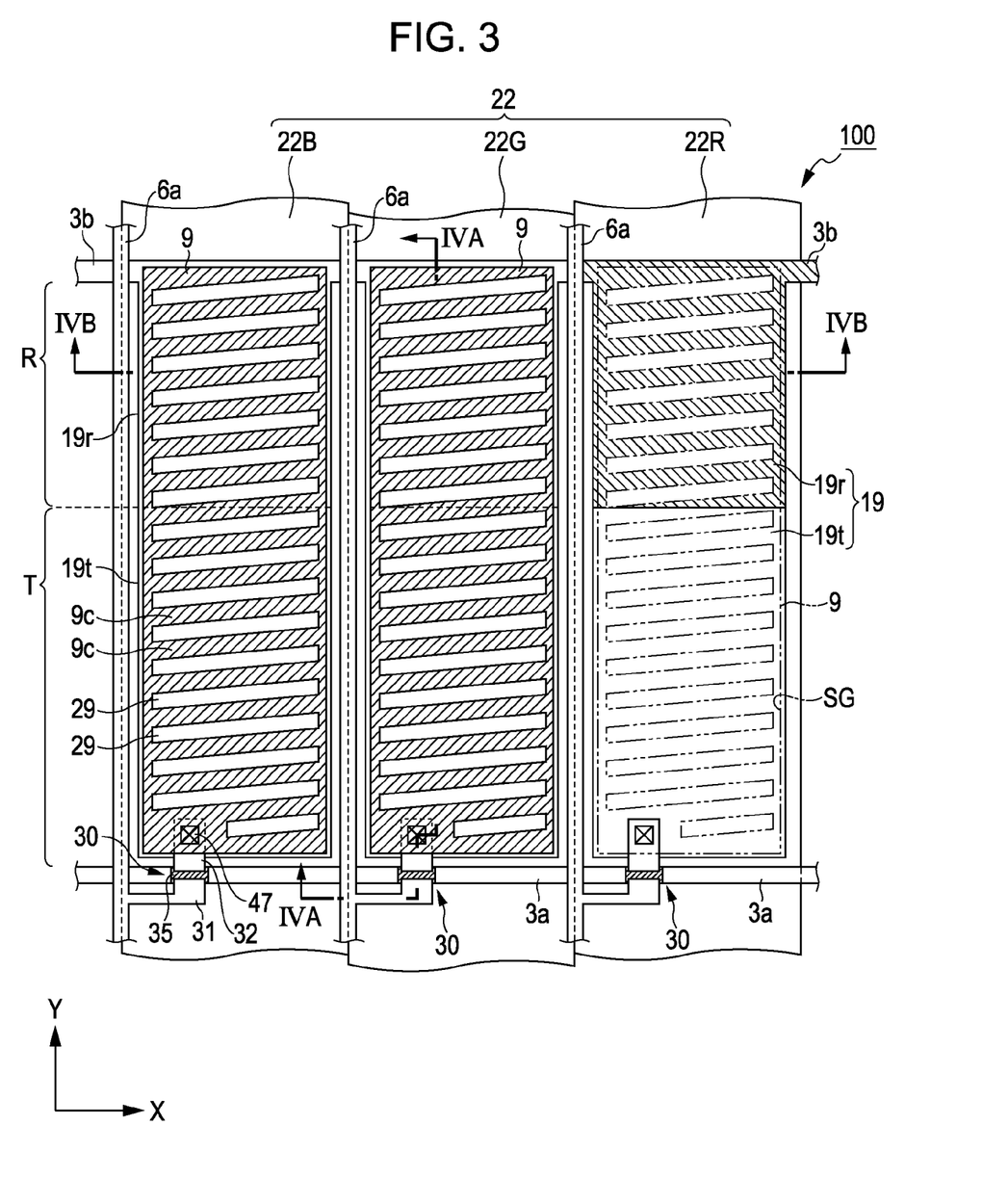
FIG. 3 is a schematic plan view showing a configuration of a pixel.

FIG. 3 is a schematic plan view showing a structure of the pixel. As shown in FIG. 3, the one pixel of the liquid crystal device 100 includes the three subpixels SG corresponding to the three colors (R, G and B) of color filters 22R, 22G and 22B. The each subpixel SG includes the square pixel electrode 9 formed with a plurality of slits (clearances) 29 substantially into a ladder shape. The scanning line 3a, the common line 3b and the plurality of data lines 6a are arranged so as to surround the periphery of the pixel electrode 9.

The TFT 30 is formed near the intersection between the scanning line 3a and the data line 6a, and the TFT 30 is electrically connected to the data line 6a and the pixel electrode 9. The square shaped common electrode 19 is formed at a position substantially overlapped with the pixel electrode 9 in plan view.

The pixel electrode 9 is a conductive film formed of a transparent conductive material such as ITO. The seventeen slits 29 are formed on the pixel electrode 9 for each subpixel SG. The slits 29 extend in the direction intersecting both the scanning line 3a and the data line 6a (in the oblique direction in the drawing), and are arranged equidistantly in the Y-axis direction. The individual slits 29 are formed into substantially the same width, and extend in parallel to each other. Accordingly, the pixel electrode 9 has a plurality (sixteen in the drawing) of band-shaped electrodes 9c. As the slits 29 have the same width and arranged equidistantly, the band-shaped electrodes 9c also have the same width and are arranged equidistantly. In the first embodiment, the width of the slits 29 and the width of the band-shaped electrodes 9c are both 4 μm.

The common electrode 19 includes a transparent common electrode 19t formed of a transparent conductive material such as ITO into a square shape in plan view and a reflective common electrode 19r formed of metallic material having light-reflective property such as aluminum or silver into a substantially square shape in plan view. The transparent common electrode 19t and the reflective common electrode 19r are electrically connected to each other at the side ends thereof.

The reflective common electrode 19r is formed integrally with the common line 3b extending in parallel to the scanning line 3a. Therefore, the common electrode 19 including the transparent common electrode 19t and the reflective common electrode 19r are electrically connected to the common line 3b.

A reflective common electrode 19r formed area constitutes a reflective display area R of the corresponding subpixel SG, and the transparent common electrode 19t formed area constitutes a transmissive display area T.

The common line 3b and the reflective common electrode 19r may be formed with separate conductive films, or may be electrically connected to each other. In order to do so, there is a method of forming the reflective common electrode 19r and the common line 3b on different wiring layers via an interlayer insulating film and connecting the both via a contact hole formed in the interlayer insulating film. The transparent common electrode 19t may be formed so as to cover the reflective common electrode 19r.

The TFT 30 includes a semiconductor layer 35 formed of island-shaped amorphous silicon film formed partly on the scanning line 3a, a source electrode 31 branched from the data line 6a and extended on the semiconductor layer 35, and a square shaped drain electrode 32 extending from over the semiconductor layer 35 to the pixel electrode 9 formed area.

The scanning line 3a functions as a gate electrode of the TFT 30 at a position opposing the semiconductor layer 35. The drain electrode 32 and the pixel electrode 9 are electrically connected via a pixel contact hole 47 formed at a position where the both of them are overlapped with each other in plan view.

In the subpixel SG shown in the drawing, an area where the pixel electrode 9 and the common electrode 19 are overlapped with each other in plan view serves as a capacity of the corresponding subpixel SG. Therefore, it is not necessary to provide a separate retaining capacity for retaining the image signal within the subpixel SG formed area, so that a high numerical aperture may be obtained.

Figure 4A:
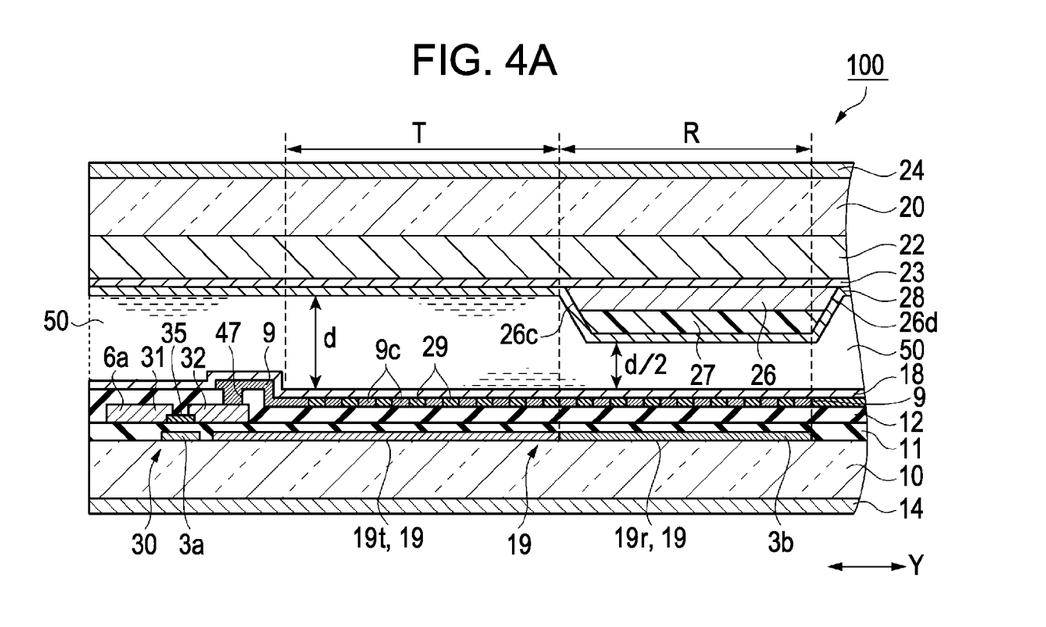
FIG. 4A is a cross-sectional view taken along the line IVA-IVA in FIG. 3.
Figure 4B:
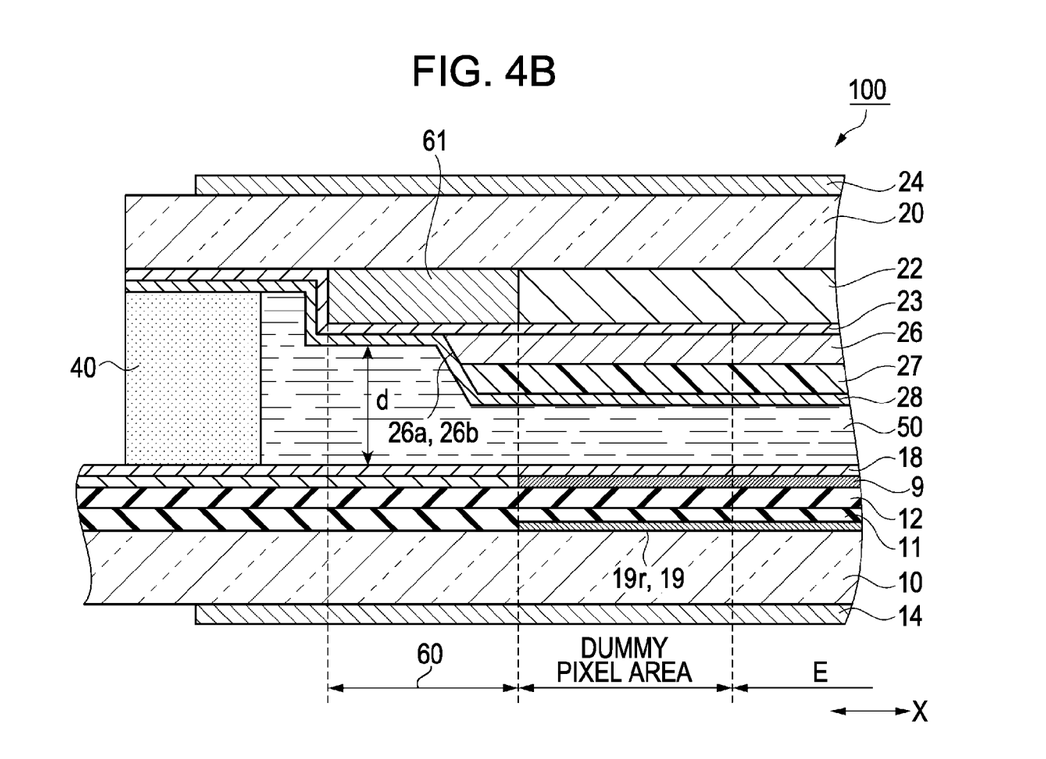
FIG. 4B is a cross-sectional view including a parting area in the X-axis direction.
Figure 5A:
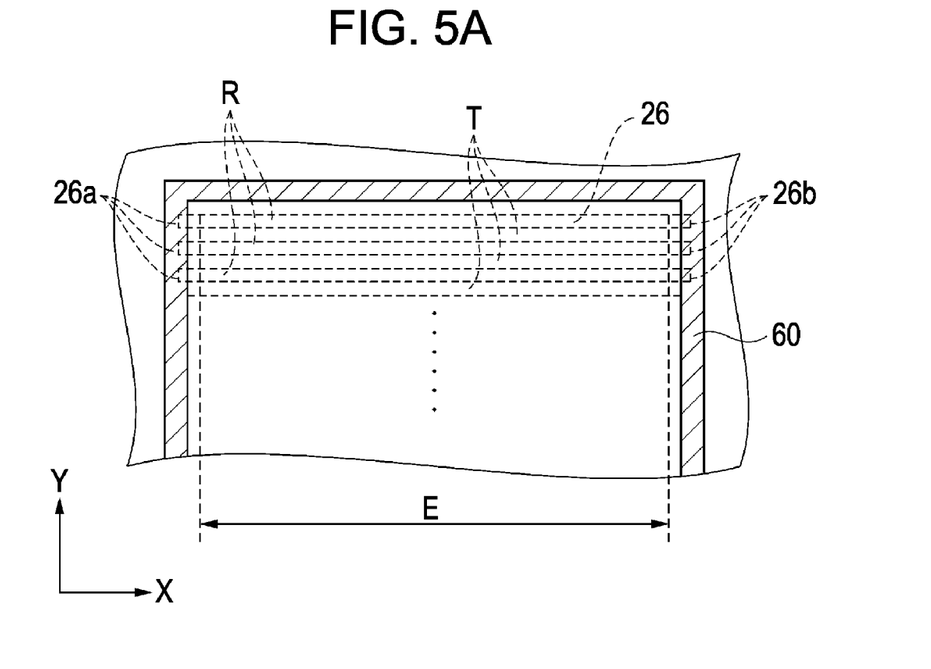
FIG. 5A is a schematic plan view illustrating the arrangement of a retardation film.
Figure 5B:
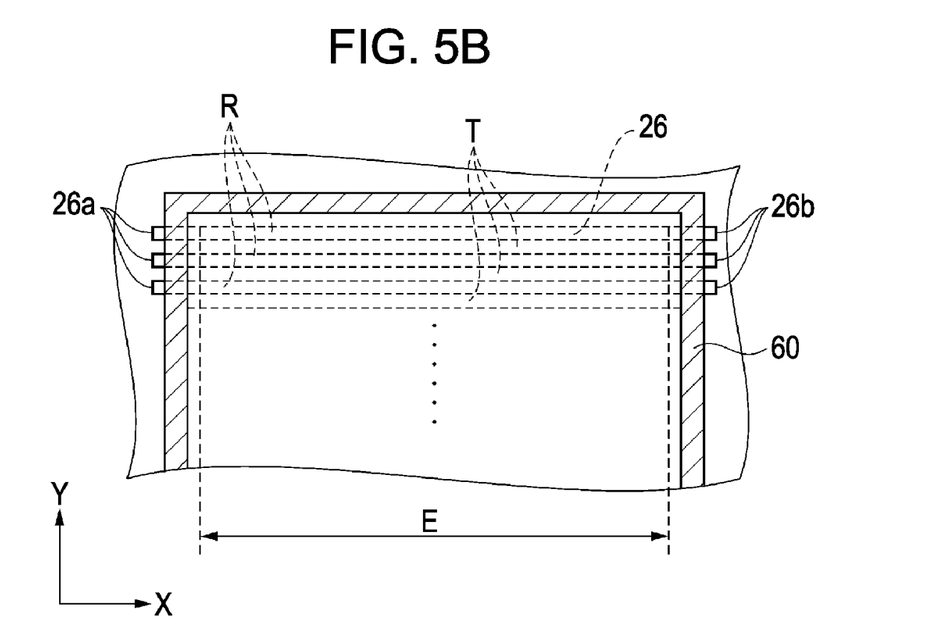
FIG. 5B is a schematic plan view illustrating the arrangement of the retardation film.

Referring now to FIGS. 4A and 4B and FIGS. 5A and 5B, the structure of the liquid crystal device 100 will be described further in detail. FIG. 4A is a schematic cross-sectional view showing the structure of the liquid crystal device taken along the line IVA-IVA in FIG. 3, and FIG. 4B is a schematic cross-sectional view including a parting area in the X direction (the portion of the subpixel corresponds to a cross-sectional view taken along the line IVB-IVB in FIG. 3). FIGS. 5A and 5B are schematic plan views showing the arrangement of the retardation film.

As shown in FIG. 4A, the liquid crystal device 100 includes the liquid crystal layer 50 sandwiched between the element substrate 10 having the pixel electrode 9 and the opposed substrate 20 having a color filter 22. A retardation film 26 and a cell thickness adjusting layer 27 are selectively formed on the color filter 22 of the opposed substrate 20 (on the side of the liquid crystal layer 50) corresponding to the reflective display area R. Therefore, the thickness of the cell of the reflective display area R is smaller than the thickness d of the cell of the transmissive display area T and, in the first embodiment, it is approximately d/2, that is, about a half.

In the reflective liquid crystal device 100, it is necessary that the incident light should be substantially circularly polarized light in all the visible wavelength, in terms of the optical design, when the incident light reaches the reflective common electrode 19r so that dark black can be displayed. If the incident light which reaches the reflective common electrode 19r is an elliptically polarized light, the black display is subjected to coloring, and the high-contrast reflective display is hardly obtained.

Therefore, in the first embodiment, the retardation film 26 and the cell thickness adjusting layer 27 are selectively formed in an area corresponding to the reflective display area R on the color filter 22, so that the thickness of the cell in the reflective display area R is smaller than that of the transmissive display area T. Accordingly, a lower polarizing plate 14, the retardation film 26 and the liquid crystal layer 50 in the reflective display area R are able to form a wide band circularly polarized light, whereby the outside light which reaches the reflective common electrode 19r are approximated to the circularly polarized light at all the visible wavelengths.

On the element substrate 10 formed of transparent glass or the like is formed with the scanning line 3a, the common electrode 19 and the common line 3b thereon. An insulating thin film 11 formed of silicone oxide film or the like is formed so as to cover the scanning line 3a, the common electrode 19 and the common line 3b. An island-shaped semiconductor layer 35 is formed on the insulating thin film 11, and a source electrode 31 and a drain electrode 32 are also formed on the insulating thin film 11 so as to be partly overlapped with the semiconductor layer 35. An interlayer insulating film 12 formed of a silicon oxide film or a resin film is formed so as to cover the semiconductor layer 35, the source electrode 31, the drain electrode 32. The pixel electrode 9 is formed on the interlayer insulating film 12 and the pixel electrode 9 and the drain electrode 32 are electrically connected via the pixel contact hole 47 which penetrates through the interlayer insulating film 12 and reaches the drain electrode 32.

An alignment film 18 formed of polyimide or the like is formed so as to cover the pixel electrode 9. The alignment film 18 is applied with alignment process such as a rubbing process to align liquid crystal molecules in a predetermined direction. The alignment direction controlled by the alignment film 18 in the first embodiment is a direction parallel to the direction of extension of the scanning line 3a, and is a direction intersecting the direction of extension of the slits 29 of the pixel electrode 9.

The color filter 22 (22B, 22G and 22R), an alignment film 23, the retardation film 26, the cell thickness adjusting layer 27 and an alignment film 28 are formed on the opposed substrate 20 formed also of transparent glass or the like in sequence. An upper polarizing plate 24 is bonded on the surface (the surface on the opposite side from the liquid crystal layer 50) of the opposed substrate 20. The optical arrangement of the lower polarizing plate 14 on the side of the upper polarizing plate 24 and the element substrate 10 is crossed Nicols.

The color filter 22 is formed, for example, by applying a photosensitive resin material including coloring material of each color on the opposed substrate 20 and exposing and developing the same through the photolithography method. The method of applying may be selected from the methods such as spin coat and slit coat.

The retardation film 26 is selectively formed in the reflective display area R on the color filter 22. The retardation film 26 provides light passing through the retardation film 26 with a retardation of about ½ wavelength ($\lambda/2$), and is a so-called inner retardation film provided on the inner side of the cell having the liquid crystal layer 50 sandwiched between the pair of substrates.

The retardation film 26 as such may be formed through a known method. For example, it is formed by a method including steps of applying polymer liquid crystal solution or liquid crystal monomer solution on the alignment film 23 formed so as to cover the color filter 22 and curing the same in a state of being aligned in a predetermined direction. The method of selectively forming the retardation film 26 so as to correspond to the reflective display area R includes a method of masking a necessary portion and removing an unnecessary portion by etching.

Alternatively, there is a method including the steps of applying a photopolymerizable liquid crystal compound on the alignment film 23 and curing the same in a state of masking the unnecessary portion and maintaining the alignment of the necessary portion, and then removing an uncured portion (unnecessary portion) using a developing fluid such as organic solvent or the like. With the methods shown above, the end portions of the retardation film 26 are not formed vertically and are apt to be reduced and incline in the etching process or in the developing process. In the latter example in which the photopolymerizable liquid crystal compound is used, when the layer thickness (film thickness) of the retardation film 26 is defined to be 1.5 to 2 μm, the distance of the inclined end portion in the horizontal direction was about 3 to 10 μm. In other words, the inclined portion having a length longer than double the layer thickness was formed at the end portions.

The above-described alignment film 23 which controls the direction of alignment of the polymer liquid crystal, the liquid crystal monomer and the photopolymerizable liquid crystal compound may be formed of the same material as the alignment films 18 and 28 which faces the liquid crystal layer 50. In such a case, the surface of the alignment film 23 is rubbed to control the direction of alignment. In addition to the above mentioned alignment film 23, there is also a method of obliquely depositing silicon oxide or the like or a method of applying a photosensitive alignment material and irradiating UV-light thereon to cause photo-alignment.

The value of the retardation to be provided to light which passes through the retardation film 26 may be adjusted by the type of the liquid crystal polymer, which is a material for the retardation film 26, and the thickness of the retardation film 26. In the end portions described above, however, the retardation film 26 has a tapered shape and hence the thickness of the layer is gradually reduced, so the retardation is also changed. In the first embodiment, the retardation of the retardation film 26 is 280 nm, which is equal to the retardation ($\lambda/2$) of the liquid crystal layer 50 of the transmissive display area T. The retardation of the liquid crystal layer 50 is obtained by multiplying the birefringence $\Delta n$ of the liquid crystal molecule by cell thickness d. Therefore, the retardation of the liquid crystal layer 50 of the reflective display area R is $\lambda/4$.

FIGS. 5A and 5B are schematic plan views illustrating examples of arrangement of the retardation film. The retardation films 26 in the first embodiment are arranged as described below considering the change in the retardation of the end portions describe above. The retardation films 26 are each formed into a band-shape (continuing in the X-axis direction) so as to continue across the reflective display areas R of the plurality of subpixels SG. Accordingly, the number of ends of the retardation film 26 which exist in the subpixels SG is reduced in comparison with the case of forming the retardation film 26 for each subpixel SG.

As shown in FIG. 5A, the retardation films 26 are formed in such a manner that the end portions 26a, 26b on the short sides of the band-shaped retardation film 26 are positioned in the parting area 60. More specifically, as shown in FIG. 4B, the retardation films 26 are formed in such a manner that the tapered end portions 26a (26b) terminate under a light-shielding film 61 provided in the parting area 60. In other words, since the both end portions 26a, 26b of the band-shaped retardation films 26 are positioned under the light-shielding film 61, respectively, the effect of the change in thickness at the end portions 26a (26b) of the retardation film 26 is avoided. It is also possible to form the retardation films 26 in such a manner that the end portions 26a (26b) are positioned further outside the parting area 60 as shown in FIG. 5B as a matter of course. However, in order to avoid unevenness of the cell thickness caused by the retardation films 26 being overlapped with the sealing member 40, the retardation films 26 are preferably formed so as not to be overlapped with the sealing member 40. The cell thickness adjusting layers 27 formed on the retardation films 26 are also formed into a band-shape so as to avoid unevenness of the cell thickness in the reflective display area R. The cell thickness adjusting layers 27 may be formed, for example, through the photolithography method using transparent photosensitive acrylic resin.

In the first embodiment, since the transmissive display area T and the reflective display area R in each subpixel SG are not partitioned by the light-shielding film, one of the end portions 26c (see FIG. 4A) of the retardation film 26 in the subpixel SG is formed so as to be positioned within the reflective display area R. The other end portion 26d (see FIG. 4A) is preferably formed so as to be positioned between the subpixels SG aligned in the Y-axis direction, that is, between the pixels. Accordingly, the retardation film 26 does not invade the transmissive display area T, and hence the unevenness of the cell thickness in the transmissive display area T is avoided. Even when the one end portions 26c are positioned within the reflective display area R, coloring of the end portions 26c due to the change in the retardation is indistinctive because the brightness of the reflective display is lower than the brightness of the transmissive display.

As shown in FIG. 4B, a dummy pixel including a dummy pixel electrode 9 and a dummy color filter 22 is provided between the display area E and the parting area 60. The dummy pixel is adjacent to the subpixel SG which contributes to display, and is for preventing the abrupt change in cell thickness in the outer periphery of the display area E. Therefore, it is not necessary to electrically connect the dummy pixel electrode 9 to the TFT 30 as a matter of course. In other words, since the dummy pixel does not contribute to display, the band-shaped retardation film 26 may be formed in such a manner that the both end portions 26a and 26b are positioned in the dummy pixel area formed with the dummy pixels. The dummy color filter 22 does not need to include color materials and may be transparent.

The alignment film 28 shown in FIG. 4A has the same configuration as the alignment film 18 formed on the element substrate 10, but the direction of alignment control of the alignment film 28 is anti-parallel to the direction of alignment control of the alignment film 18. In other words, in the alignment process, the alignment film 18 is rubbed in the opposite direction at an angle of 180°. Therefore, the liquid crystal layer 50 exhibits the homogeneous alignment as the initial alignment state between the element substrate 10 and the opposed substrate 20. A mode in the non-driven state is "normally black mode" from the relation with the optic axes of the upper and lower polarizing plates 24 and 14 adhered to the front and back faces of the cell. It is also applicable to "normally white mode" depending on the optical design.

The liquid crystal device 100 in the first embodiment includes the transmissive display area T and the reflective display area R in each subpixel SG, and is a so-called FFS (Fringe Field Switching) system having the retardation film 26 in the cell corresponding to the reflective display area R. The optical design is optimized, and the end portions 26a and 26b are provided outside the display area E so that the change in the retardation and the unevenness of the cell thickness at the both end portions 26a and 26b at both sides of the band shaped retardation films 26 do not affect display. Therefore, the light leakage in the frame-shape (uneven contrast) does not occur in the display area E and the transmissive display and the reflective display are achieved.

According to the first embodiment, the following effects are achieved.

(1) The liquid crystal device 100 has the band-shaped retardation films 26 in the cell (between the pair of opposed substrates) so as to continue across the reflective display areas R in the plurality of subpixels SG. The both end portions 26a and 26b of the band-shaped retardation films 26 are positioned in the parting area 60 provided outside the display area E. Therefore, the light leakage in the frame-shape (uneven contrast) of the display area E caused by the change in the retardation of the end portions 26a, 26b and the unevenness of the cell thickness may be reduced. Even when the retardation film 26 is formed in such a manner that one of the both end portions 26a, 26b of the retardation film 26 is positioned outside the display area E, the effect corresponding thereto is achieved.

(2) In the liquid crystal device 100, one of the end portions 26c of the retardation film 26 in the subpixel SG is formed so as to be positioned in the reflective display area R. The other end portion 26d is formed so as to positioned between the sub pixels SG arranged in the Y-axis direction. Accordingly, since the retardation film 26 does not invade the transmissive display area T, and hence the unevenness of the cell thickness in the transmissive display area T is avoided. In addition, coloring due to the change in the retardation of the one end portion 26c can be made indistinctive. Furthermore, since the other end portion 26d is positioned between the subpixels SG in the Y-axis direction, the affect of the change in the retardation provided to the reflective display may be reduced.

(3) The liquid crystal device 100 is optimized in the optical design, and the retardation films 26 are arranged in the cell so as to prevent the change in the retardation or the unevenness of the cell thickness in the both end portions 26a, 26b in the band-shaped retardation films 26. Therefore, the liquid crystal device 100 of the transflective FFS system having a superior display quality is provided.

Second Embodiment

Figure 6:
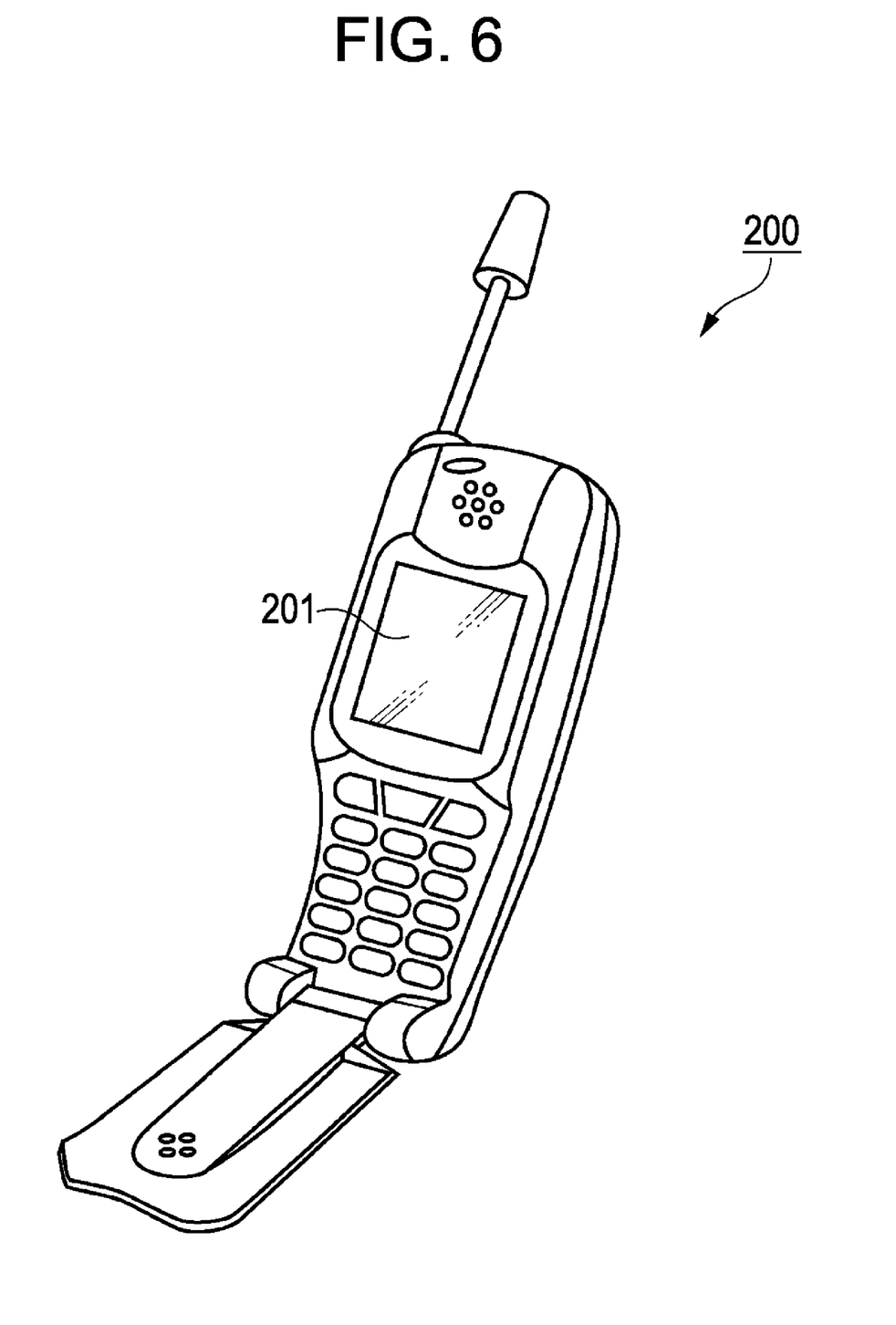
FIG. 6 is a schematic perspective view illustrating a mobile telephone set as an electronic apparatus.

Referring now to FIG. 6, an electronic apparatus according to the second embodiment will be described. FIG. 6 is a schematic perspective view showing a mobile telephone set as the electronic apparatus.

As shown in FIG. 6, the mobile telephone set 200 in the second embodiment has a main body provided with an input unit for operation and a display 201. The liquid crystal device 100 in the first embodiment and a lighting unit for illuminating the liquid crystal device 100 are mounted to the display 201. Therefore, it is possible to confirm the displayed information from the transmissive display using transmissive light from the lighting unit and the reflective display using incident light such as the outside light. In other words, the lighting unit is not driven in an environment having a sufficient brightness such as the outdoor, and the user is able to confirm the information in the reflective display mode. In other words, the power saving is realized and hence the mobile telephone set 200 having a long battery life is achieved.

When mounting the liquid crystal device 100 to the mobile telephone set 200, a frame-shaped gasket or the like approximately at the position of the parting area 60 of the liquid crystal device 100 so as to prevent the clearance from being formed between the liquid crystal device 100 and the main body.

According to the second embodiment, the following effects are achieved.

(1) Since the mobile telephone set 200 as the electronic apparatus has the transflective liquid crystal device 100 having a high display quality mounted thereon, there is provided the mobile telephone set 200 in which the user is able to confirm displayed information irrespective of the brightness of the environment where the mobile telephone set 200 is used, and reduction of power consumption is achieved.

In addition to the embodiments shown above, various modifications may be made. These modifications are described with examples.

Modification 1

Figure 7A:
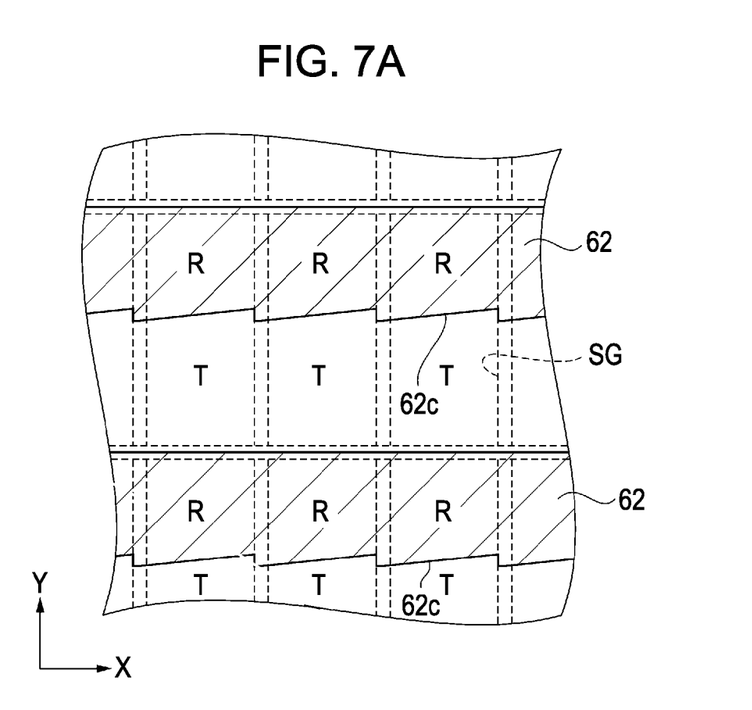
FIG. 7A is a schematic plan view illustrating the shape of the retardation film in a modification.
Figure 7B:
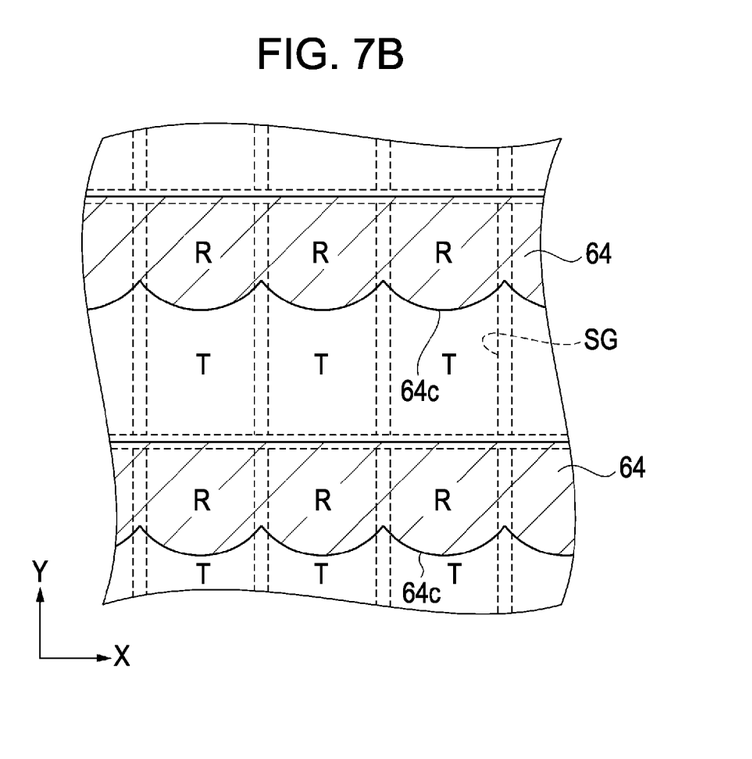
FIG. 7B is a schematic plan view illustrating the shape of the retardation film in another modification.

In the liquid crystal device 100 of the first embodiment, the shape of the band-shaped retardation film 26 is not limited thereto. FIGS. 7A and 7B are schematic plan view showing the shape of the retardation film in the modification. For example, as shown in FIG. 7A, the boundary between the transmissive display area T and the reflective display area R in each subpixel SG is inclined in plan view. In other words, the boundary between the transparent common electrode 19t and the reflective common electrode 19r shown in FIG. 3 is inclined to the same inclination as the slits 29 formed on the pixel electrode 9. As a matter of course, the shape of the band-shaped retardation film 62 is formed into a sawtooth shape at one end portion 62c so as to correspond thereto. Accordingly, the end portion 62c is inclined in plan view in the liquid crystal twisting direction when a drive voltage is applied to the pixel electrode 9 and the common electrode 19, the possibility of occurrence of defective alignment in domain or the like in the alignment control at the boundary described above is reduced. Also, for example, the one end 64c may be formed into an arcuate-shaped retardation film 64 as shown in FIG. 7B corresponding to the shape of the reflective common electrode 19r in plan view.

Modification 2

Figure 8A:
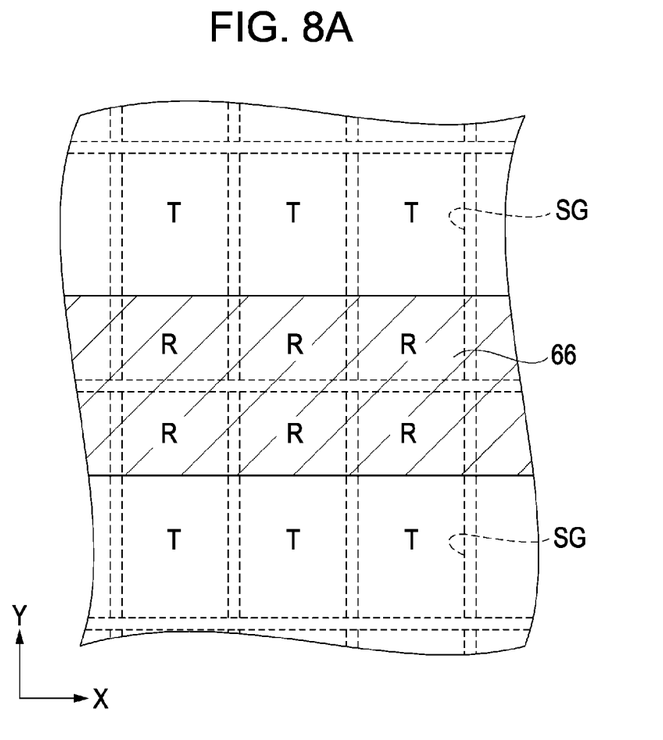
FIG. 8A is a schematic plan view illustrating the arrangement of the retardation film in a modification.
Figure 8B:
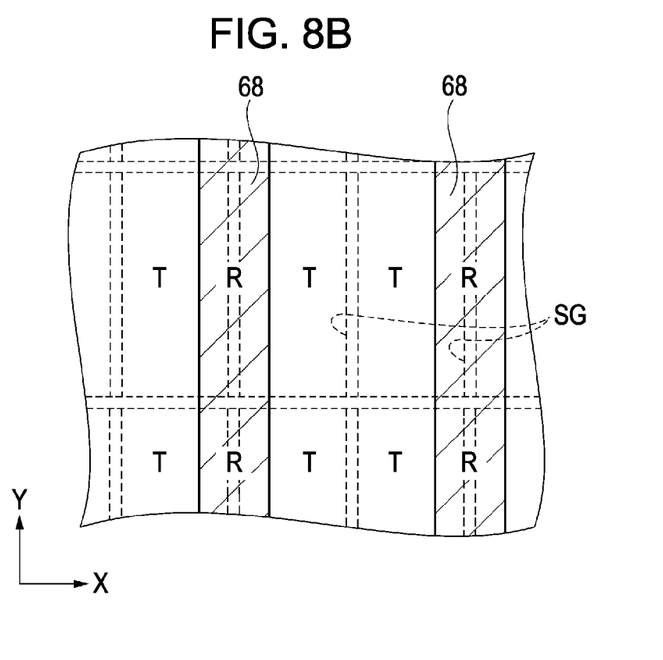
FIG. 8B is a schematic plan view illustrating the arrangement of the retardation film in another modification.

In the liquid crystal device 100 according to the first embodiment, the arrangement of the band-shaped retardation film 26 is not limited thereto. FIGS. 8A and 8B are schematic plan view illustrating the arrangement of the retardation film in Modification 2. For example, as shown in FIG. 8A, a band-shaped retardation film 66 extending in the X-axis direction continuing across the subpixels SG being adjacent in the Y-axis direction is applicable. Furthermore as shown in FIG. 8B, a band-shaped retardation film 68 extending in the Y-axis direction continuing across the subpixels SG being adjacent in the X-axis direction is also applicable. As a matter of course, the reflective common electrode 19r in each subpixel SG is formed according to the retardation film 68 and the area of the reflective display area R is determined on the basis of the optical design.

Modification 3

In the liquid crystal device 100 according to the first embodiment, the parting area 60 may be set as a virtual area instead of providing the light-shielding film 61 in the parting area 60. For example, in the mobile telephone set 200 as the electronic apparatus shown in the second embodiment, by integrating the liquid crystal device 100 via a frame-shaped gasket which matches the virtual parting area 60, the light-leakage caused by the change in the layer thickness at the end portions 26a, 26b of the band-shaped retardation film 26 is actually shielded by the gasket.

Modification 4

In the liquid crystal device 100 according to the first embodiment, the configuration in which the cell thickness adjusting layer 27 is provided on the retardation film 26 is not limited thereto. For example, the cell thickness adjusting layer 27 may be provided on the element substrate 10. In this case, the cell thickness adjusting layer 27 is preferably provided under the reflective common electrode 19r. It is also possible to adjust the layer thickness of the retardation film 26 so as to have the cell thickness adjusting function and eliminate the cell thickness adjusting layer 27. In this configuration, a simpler cell structure is achieved.

Modification 5

In the liquid crystal device 100 in the first embodiment, the configuration of the subpixel SG which realizes the reflective display area R is not limited to the reflective common electrode 19r having a light reflecting property. For example, a configuration in which the transparent common electrode 19t having the same size as the pixel electrode 9 in plan view is provided and a reflective layer having the light reflecting property is formed under the transparent common electrode 19t. For example, the reflective layer may be formed by a method of forming a metal thin film such as A1 or Ag over the resin layer having plurality of depressions and projections. Such reflective layer is formed corresponding to the reflective display area R. In this arrangement, the directivity of light reflected from the reflecting layer is reduced to realize a bright reflecting display.

Modification 6

Figure 9A:
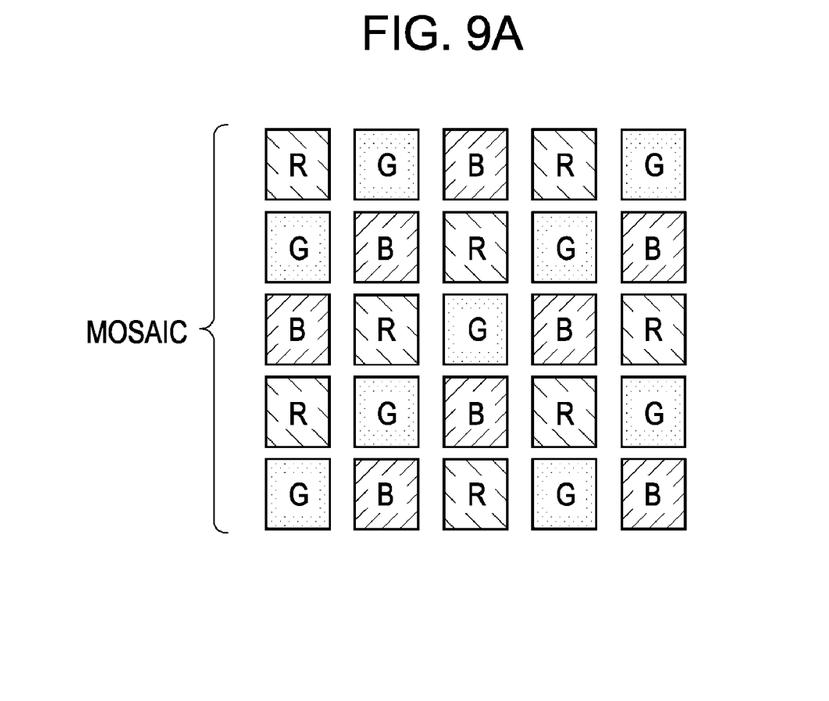
FIG. 9A is a schematic plan view illustrating the arrangement of a color filter in a modification.
Figure 9B:
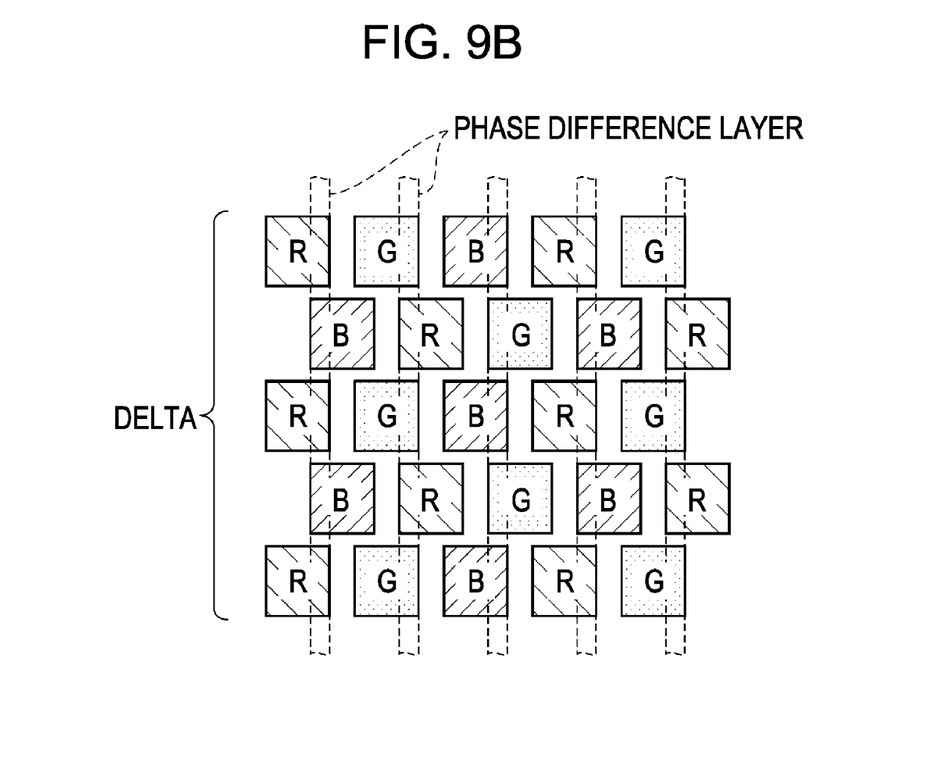
FIG. 9B is a schematic plan view illustrating the arrangement of the color filter in another modification.

In the liquid crystal device 100 according to the first embodiment, the arrangement of the color filters 22R, 22G and 22B in three colors is not limited to the stripe pattern. FIGS. 9A and 9B are schematic plan view showing the arrangement of the color filter. For example, the arrangement in the mosaic pattern as shown in FIG. 9A and the arrangement in the delta pattern as shown in FIG. 9B as well, the configuration of the retardation film in the first embodiment will be applied. In particular, when the retardation films are arranged in the vertical direction in the drawing in the delta pattern, there is a method of arranging the retardation films so as to continue across the two colors of color filters arranged in the vertical direction. The color filter 22 is not limited into three colors, and may have a multicolor configuration including colors other than R, G and B added thereto. It is also possible not to provide the color filter 22 and to apply to the transflective liquid crystal device in, so-called, white and black display.

Modification 7

The liquid crystal device 100 in the first embodiment 1 is not limited to the transflective FFS system. For example, transflective liquid crystal devices of the IPS system or the VA (Vertical Alignment) system are also applicable. The switching element is not limited to the TFT 30, but may be a TFD (Thin Film Diode) element. The invention is not limited to the active system provided with the switching element, but is applicable to the liquid crystal device of a simple matrix system.

Modification 8

In the second embodiment, the electronic apparatus having the liquid crystal device 100 mounted thereto is not limited to the mobile telephone set 200. For example, it is preferable to be mounted to the electronic apparatuses such as laptop type personal computers, electronic databooks, viewers or DVD players displaying the image information, or mobile information terminals.

What is claimed is:

1. A liquid crystal device comprising:

a pair of substrates;

a liquid crystal layer sandwiched between the pair of substrates;

a display area having a plurality of pixels arranged therein and extending along a first plane, the pixels each including a transmissive display area and a reflective display area; and a retardation film provided on one of the pair of substrates in a band-shape so as to continue across the reflective display areas of the plurality of pixels, wherein a first end portion of the band-shaped retardation film is positioned within the reflective display without extending into the transmissive display area along an axis parallel to the plane, wherein a second end portion of the band-shaped retardation film is positioned between pixels along the axis parallel to the plane and outside the display area, wherein at least one dummy pixel is provided in a dummy pixel area that is outside the display area, wherein a third end portion and a fourth end portion of the band-shaped retardation film extend outwardly to at least a parting area that is outside of the dummy pixel area, the parting area including a light-shielding material extending around the display area and that overlaps the third end portion and the fourth end portion, and wherein the first end portion and the second end portion are inclined.

2. An electronic apparatus comprising the liquid crystal device according to claim 1.

3. The liquid crystal device according to claim 1, wherein the retardation film extends outwardly beyond the parting area.

4. The liquid crystal device according to claim 1, further comprising:
   a seal that seals the liquid crystal layer between the pair of substrates;
   wherein the seal surrounds the parting area which, in turn, surrounds the display area; and
   the retardation film extends from the display area outwardly beyond the parting area, without being overlapped with the seal.

5. The liquid crystal device according to claim 1, further comprising:
   a seal that seals the liquid crystal layer between the pair of substrates;
   wherein the seal surrounds the parting area which, in turn, surrounds the display area.

6. The liquid crystal device according to claim 5, wherein the third end portion and the fourth end portion of the retardation film are inclined.

7. The liquid crystal device according to claim 6, wherein a length of at least one of the inclined end portions is more than double a thickness of the retardation film.

8. The liquid crystal device according to claim 1, wherein each pixel includes only one retardation film, and the retardation film is common to at least two rows or columns of the pixels.

* * * * *